US012565753B2

(12) United States Patent
Kishida et al.

(10) Patent No.: US 12,565,753 B2
(45) Date of Patent: Mar. 3, 2026

(54) CONSTRUCTION MACHINE

(71) Applicant: Caterpillar SARL, Geneva (CH)

(72) Inventors: Kouji Kishida, Akashi (JP); Kazumasa Matsumura, Akashi (JP); Shinichi Nishiyama, Kobe (JP)

(73) Assignee: Caterpillar SARL, Geneva (CH)

( * ) Notice: Subject to any disclaimer, the term of this patent is extended or adjusted under 35 U.S.C. 154(b) by 339 days.

(21) Appl. No.: 17/777,685

(22) PCT Filed: Nov. 12, 2020

(86) PCT No.: PCT/EP2020/025511
§ 371 (c)(1),
(2) Date: May 18, 2022

(87) PCT Pub. No.: WO2021/098984
PCT Pub. Date: May 27, 2021

(65) Prior Publication Data
US 2022/0396931 A1 Dec. 15, 2022

(30) Foreign Application Priority Data

Nov. 18, 2019 (JP) ................................. 2019-207797

(51) Int. Cl.
*E02F 9/08* (2006.01)
*B60K 1/04* (2019.01)
(Continued)

(52) U.S. Cl.
CPC .............. *E02F 9/0866* (2013.01); *B60K 1/04* (2013.01); *B60L 50/66* (2019.02);
(Continued)

(58) Field of Classification Search
CPC .......... E02F 9/0866; B60L 50/66; B60L 1/00; B60L 2200/40; B60K 1/04; B60K 2001/0416

See application file for complete search history.

(56) References Cited

U.S. PATENT DOCUMENTS 9,790,662 B2 10/2017 Ota et al.
2005/0281002 A1 12/2005 Miller
(Continued)

FOREIGN PATENT DOCUMENTS

CN 102729792 A 10/2012
CN 102947512 2/2013
(Continued)

OTHER PUBLICATIONS

The translation of Moriguchi (JP 2013139675 A ) relied upon in the office action is included for the sake of clarity of the record. (Year: 2013).*

(Continued)

*Primary Examiner* — James A Shriver, II
*Assistant Examiner* — Nicholas R. Kandas

(57) ABSTRACT

To provide a construction machine capable of preventing damages of batteries placed on a machine-body frame. A construction machine comprises a machine-body frame, a supporting plate installed on the machine-body frame via elastic mounts, and batteries fixed to a topside of the supporting plate. Welding is not performed on the supporting plate.

4 Claims, 6 Drawing Sheets

(51) Int. Cl.
    *B60L 1/00*          (2006.01)
    *B60L 50/60*       (2019.01)

(52) U.S. Cl.
    CPC ......... *B60K 2001/0416* (2013.01); *B60L 1/00*
               (2013.01); *B60L 2200/40* (2013.01)

(56)             References Cited

U.S. PATENT DOCUMENTS

| | | | |
|---|---|---|---|
| 2013/0078071 A1* | 3/2013 | Noguchi | B60K 1/04 |
| | | | 414/719 |
| 2017/0016206 A1* | 1/2017 | Ota | E02F 9/0858 |

FOREIGN PATENT DOCUMENTS

| | | | |
|---|---|---|---|
| CN | 206465759 U | 9/2017 | |
| CN | 109649214 | 4/2019 | |
| EP | 2565330 A1 | 3/2013 | |
| EP | 2584101 A1 | 4/2013 | |
| JP | 2008044408 A | 2/2008 | |
| JP | 2012202065 A | 10/2012 | |
| JP | 2013139675 | 7/2013 | |
| JP | 2013139675 A | * 7/2013 | |
| JP | 2016030924 A | 3/2016 | |
| WO | 2011136107 A1 | 11/2011 | |
| WO | 2011158686 A1 | 12/2011 | |
| WO | 2019114171 A1 | 6/2019 | |

OTHER PUBLICATIONS

International Search Report related to Application No. PCT/EP2020/025511; reported on Feb. 17, 2021.

Japanese Patent Office First Office Action for Japan Patent Appln. No. 2019-207797, mailed Apr. 25, 2023 (4 pgs).

China Office action for Chinese Patent Appln. No.02080080519.9, mailed Oct. 10, 2024 (8 pgs).

Europe Office Action for European Application No. 20808299.0 mailed on Nov. 8, 2024 (7 pgs).

Chinese Patent Office Search Report for CN Patent Application No. 202080080519.9, mailed Feb. 28, 2025 (08 pgs).

* cited by examiner (a)

(b)

CONSTRUCTION MACHINE

This patent application is a 35 USC § 371 U.S. national stage of International Application No. PCT/EP2020/025511 filed on Nov. 12, 2020, which claims the benefit and priority of Japanese Application No. 2019-207797 filed on Nov. 18, 2019, the disclosures of which are incorporated in their entirety by reference herein.

FIELD OF THE INVENTION

The present invention relates to a construction machine capable of preventing damages of batteries placed on a machine-body frame.

BACKGROUND OF THE INVENTION

In recent years, a construction machine such as a hydraulic excavator sees increasing demands for a hybrid construction machine equipped with an engine and an electric motor for a drive source, and an electric-drive construction machine equipped with an electric motor for a drive source, due to consideration to environment and restrictions on work places. In an electric-drive construction machine, electric power is supplied from a commercial power source to an electric motor using a cable, or electric power is supplied to an electric motor from batteries placed on a machine-body frame of the electric-drive construction machine (see, for example, Patent Literature 1).

PRIOR ART LITERATURES

Patent Literatures

[PATENT LITERATURE 1] Japanese Patent Application Laid-Open No. 2012-202065

SUMMARY OF THE INVENTION

Problems to be Solved by the Invention

However, since a machine-body frame, to which batteries are fixed, is formed by welding a metal material such as a steel plate, the portion to which the batteries are fixed may be distorted by welding. In such a case, local high stresses are caused in the batteries when the batteries are fixed to the machine-body frame, and thus there is a risk that the batteries may be damaged.

An object of the present invention that has been made in view of the above-mentioned fact is to provide a construction machine capable of preventing damages to batteries placed on a machine-body frame.

Means for Solving the Problems

For solving the above-mentioned problem, the present invention provides a construction machine as follows. That is, the present invention provides a construction machine comprising a machine-body frame, a supporting plate installed on the machine-body frame via elastic mounts, and batteries fixed to a topside of the supporting plate, wherein welding is not performed on the supporting plate.

Preferably, a shelf having a plurality of shelf plates, which is arranged at intervals in an up-down direction, is installed on a rear end portion of the machine-body frame, and a plurality of the supporting plates is provided and installed on respective topsides of the plurality of shelf plates via the elastic mounts. The shelf is preferably installed on the rear end portion of the machine-body frame via additional elastic mounts. It is convenient to comprise a cover member that covers upper part, rear part, and side part of the shelf. Base plates are preferably fixed to the rear end portion of the machine-body frame, and the supporting plates are installed on topsides of the base plates via the elastic mounts. Also, electrical components other than the batteries are preferably fixed to the topsides of the supporting plates.

Favorable Effects of the Invention

In a construction machine of the present invention, since a supporting plate to which batteries are fixed is installed on the machine-body frame via elastic mounts, the effect of distortion of the machine-body frame on the supporting plate is reduced, by the elastic mounts located between the machine-body frame and the supporting plate, even if the machine-body frame is distorted by welding. Further, since welding is not performed on the supporting plate that supports the batteries, distortion due to welding is not caused in the supporting plate. Therefore, in the construction machine of the present invention, it is possible to suppress generation of local high stresses in the batteries and prevent damages to the batteries.

BRIEF DESCRIPTION OF THE DRAWINGS

FIG. 3(*b*) is a perspective view showing a state where batteries are housed in the shelf shown in FIG. 3(*a*).

FIG. 4(*b*) is a partial perspective view of the shelf in a state where supporting plates are installed on the elastic mounts shown in FIG. 4(*a*); and FIG. 4(*c*) is a partial perspective view of the shelf in a state where the batteries are fixed to the supporting plates shown in FIG. 4(*b*).

DETAILED DESCRIPTION OF THE INVENTION

Hereinbelow, a preferred embodiment of a construction machine configured in accordance with the present invention will be described with reference to the drawings, taking an electric-drive hydraulic excavator provided with an electric motor for a drive source as an example.

Figure 1:
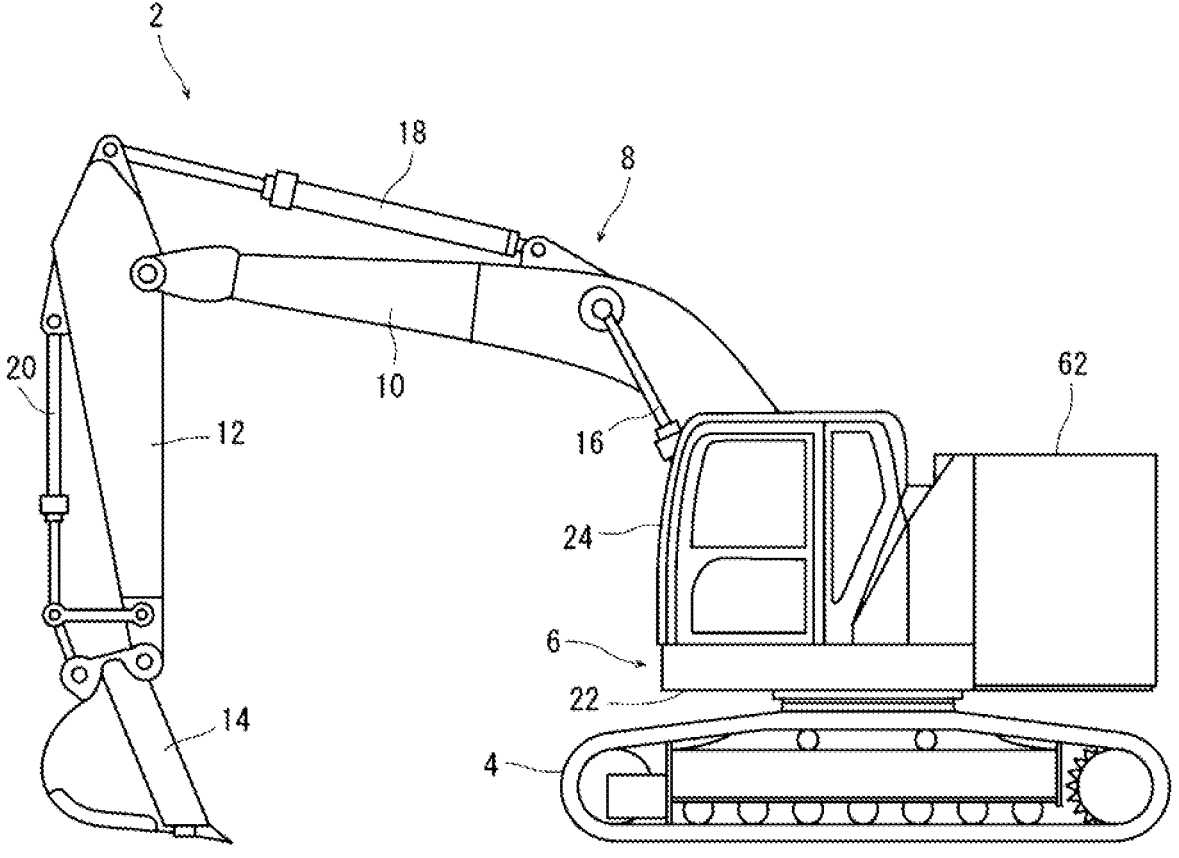
FIG. 1 is a side view of an electric-drive hydraulic excavator configured in accordance with the present invention.

When giving a description with reference to FIG. 1, the whole of an electric-drive hydraulic excavator denoted by reference numeral 2 comprises a lower traveling structure 4, an upper revolving structure 6 supported in a freely revolvable manner by the lower traveling structure 4, and a working arm device 8 installed on the upper revolving structure 6.

The working arm device 8 includes a boom 10 (a base end thereof is connected to the upper revolving structure 6), an arm 12 (a base end thereof is connected to a tip end of the boom 10), and a bucket 14 connected to a tip end of the arm 12, a boom cylinder 16 that swings the boom 10 with respect to the upper revolving structure 6, an arm cylinder 18 that swings the arm 12 with respect to the boom 10, and a bucket cylinder 20 that swings the bucket 14 with respect to the arm 12. Then, in the electric-drive hydraulic excavator 2, various works such as excavating work are adapted to be performed by swinging the boom 10, the arm 12, and the bucket 14 of the working arm device 8 by respective cylinders 16, 18, and 20.

On a frame 22 (hereinafter referred to as "machine-body frame 22") of the upper revolving structure 6, mounted are a cab 24, an electric motor (not shown) as a drive source, and a hydraulic pump (not shown) connected to an output shaft of the electric motor. The machine-body frame 22 is formed by welding an appropriate metal material such as a steel plate. In the electric-drive hydraulic excavator 2, high pressure hydraulic oil is adapted to be suppled from the hydraulic pump to the hydraulic actuators such as the boom cylinder 16, by driving the hydraulic pump by the electric motor.

Figure 2:
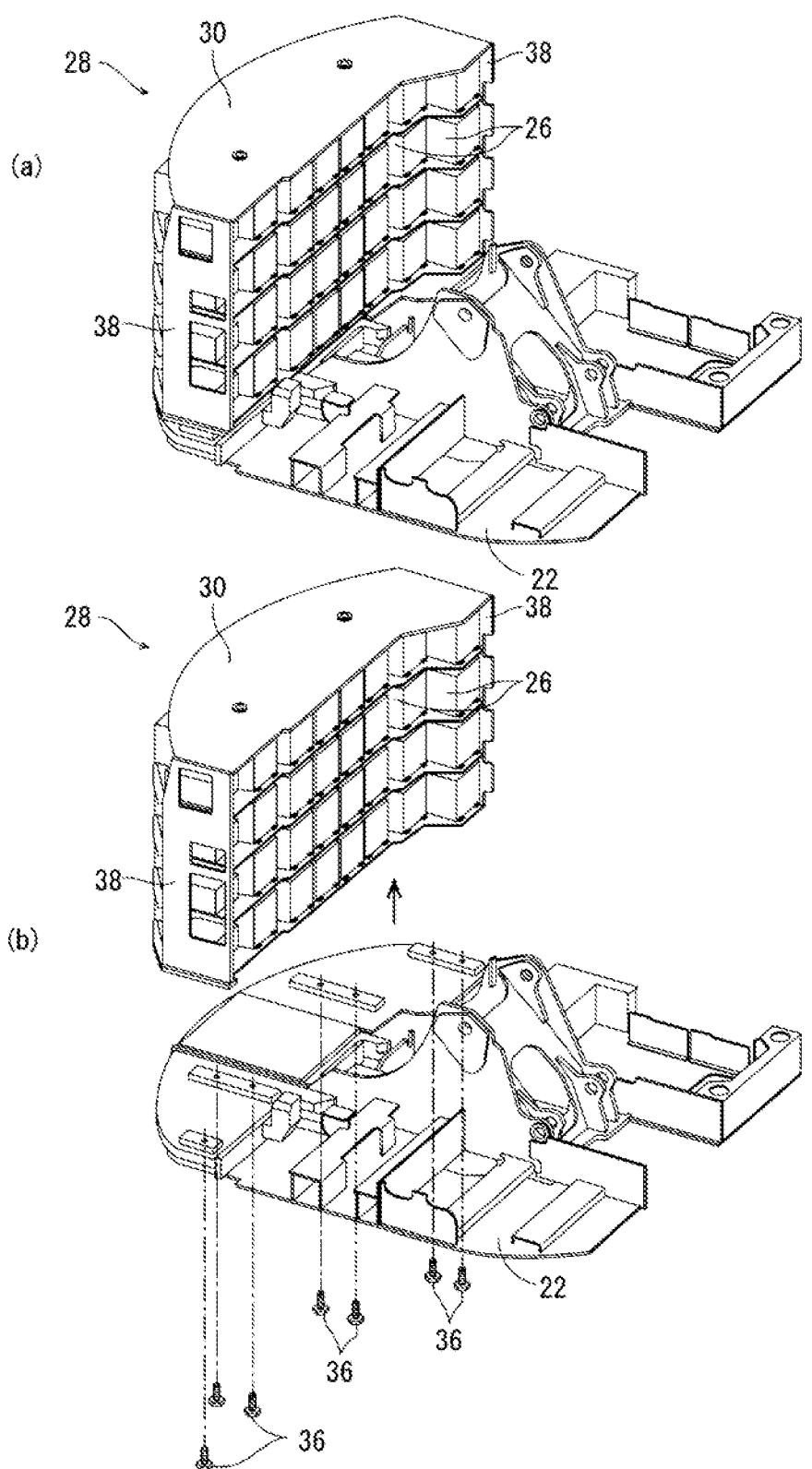
FIG. 2(*a*) is a perspective view of a machine-body frame shown in FIG. 1 and a shelf, and FIG. 2(*b*) is an exploded perspective view of the machine-body frame and the shelf shown in FIG. 2(*a*).

As shown in FIG. 2, a shelf 28 that accommodates a plurality of batteries 26 for supplying electric power to the electric motor is arranged at the rear end portion of the machine-body frame 22. As the batteries 26, for example, a lithium ion battery can be used. When giving a description with reference to FIG. 3, the shelf 28, which can be formed by welding an appropriate metal material such as a steel material, includes a top plate 30 extending substantially horizontally, a plurality of (four in the illustrated embodiment) shelf plates 32 arranged at intervals in an up-down direction below the top plate 30, and a connecting member 34 for connecting the top plate 30 and the plurality of shelf plates 32. Respective shelf plates 32 are arranged substantially horizontally, and the lowermost shelf plate 32 is fixed to the rear end portion of the machine-body frame 22 by a plurality of bolts 36 (see FIG. 2(*b*)).

Figure 3:
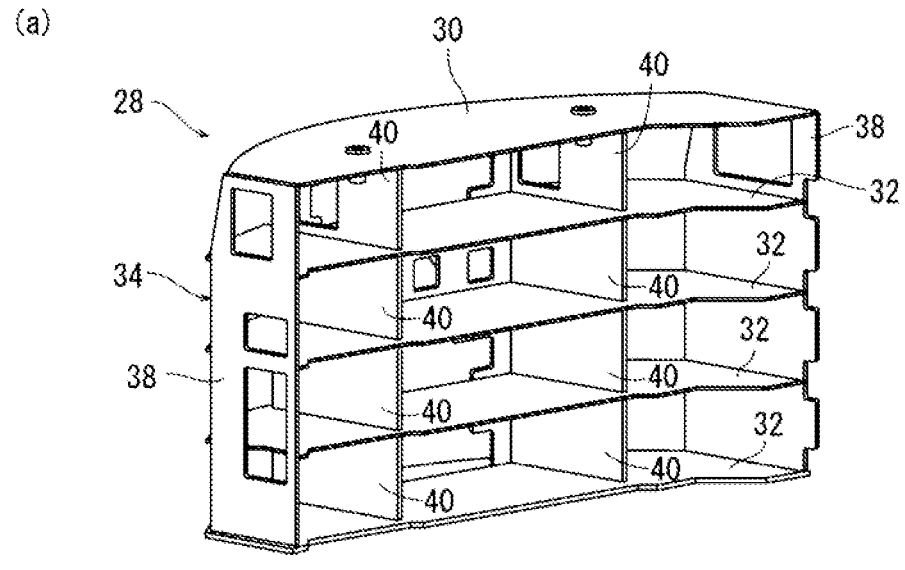
FIG. 3(*a*) is a perspective view of the shelf shown in FIG. 2.
Figure 3:
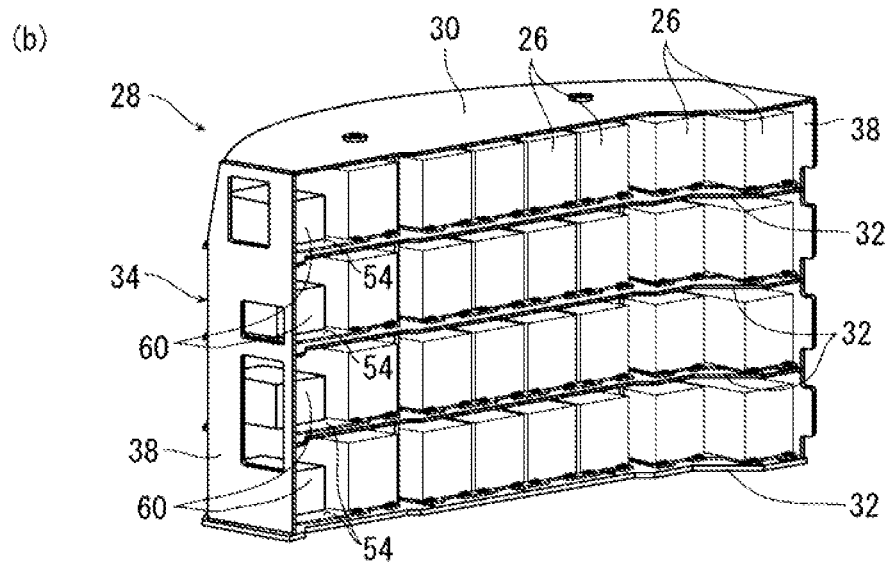

The connecting member 34 of the illustrated embodiment, as shown in FIG. 3, has a pair of side plates 38 extending downward from both ends in a width direction of the top plate 30, and a plurality (8 in the illustrated embodiment) of partition plates 40 arranged between the top plate 30 and the shelf plates 32 and between neighboring shelf plates 32 in an up-down direction between the pair of side plates 38. One side plate 38 is welded to one end portion in the width direction of the top plate 30 and one end portions in the width direction of respective shelf plates 32, and the other side plate 38 is welded to the other end portion in the width direction of the top plate 30 and to the other end portions in the width direction of respective shelf plates 32. As can be understood by referring to FIG. 3, lower end portions of respective partition plates 40 are welded to topsides of the shelf plates 32, and upper end portions of respective partition plates 40 are welded to an underside of the top plate 30 or undersides of the shelf plates 32.

Figure 4:
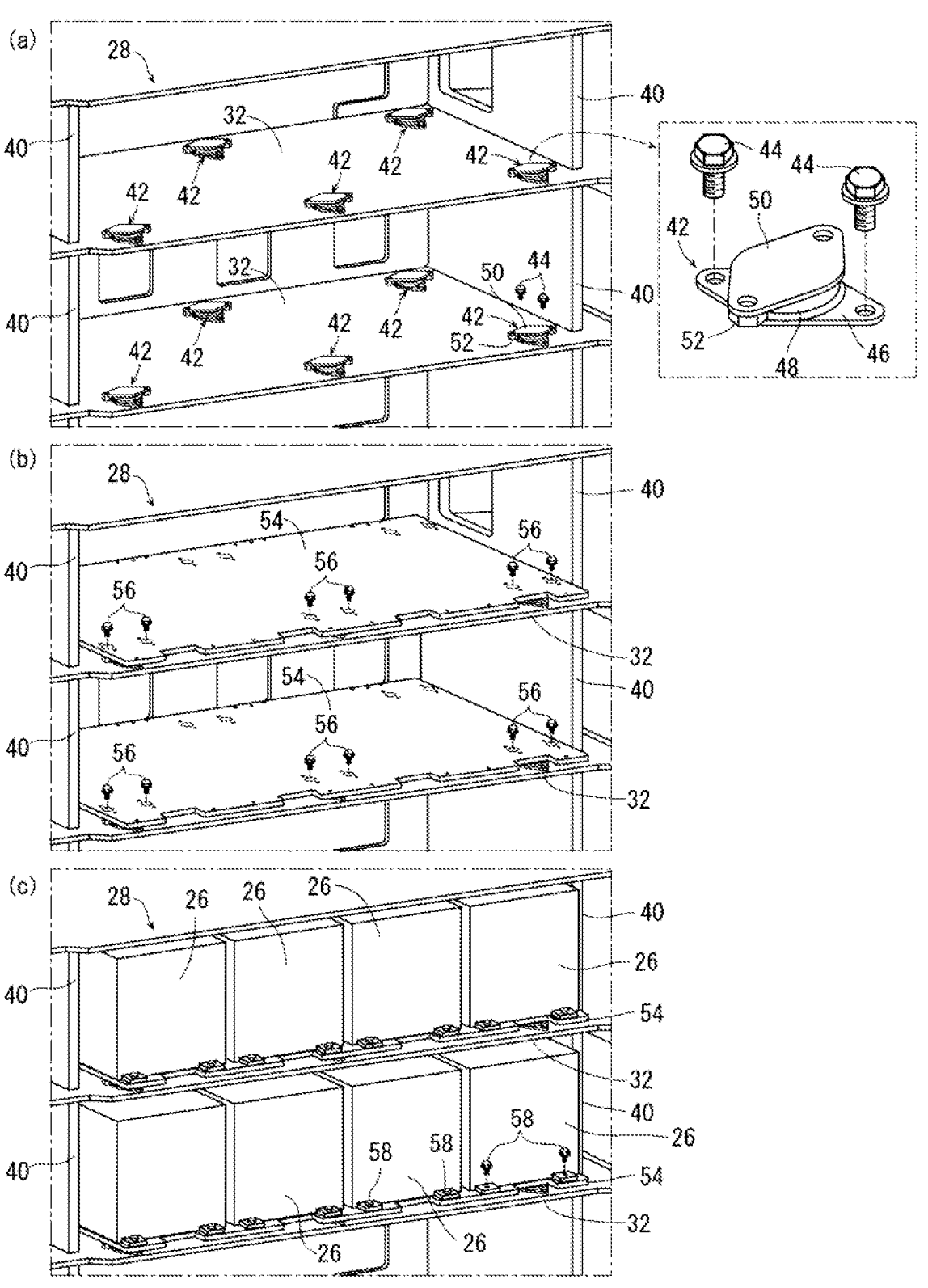
FIG. 4(*a*) is a partial perspective view of the shelf in a state where elastic mounts are fixed to shelf plates shown in FIG. 2.

When giving a description with reference to FIG. 4(*a*), a plurality of elastic mounts 42 is fixed to the topsides of respective shelf plates 32. The elastic mount 42 may have a known configuration, but the elastic mount 42 of the illustrated embodiment has a lower plate 46 made of metal in a diamond shape fixed to the topside of the shelf plate 32 with bolts 44, a rubber 48 in a column shape anchored to a topside of the lower plate 46, and an upper plate 50 made of metal in a diamond shape anchored to a topside of the rubber 48. Nuts 52 are welded to an underside of the upper plate 50.

As shown in FIG. 4(*b*), supporting plates 54 in a rectangular shape are arranged substantially horizontally above respective shelf plates 32, and the supporting plates 54 are each installed to the elastic mounts 42, by fastening the bolts 56 and the nuts 52 of the elastic mounts 42. That is, a plurality of the supporting plates 54 is provided and installed on respective topsides of the shelf plates 32 via the elastic mounts 42. The respective supporting plates 54 are formed of an appropriate metal material such as a steel plate. On the supporting plates 54, drilling for forming a hole through which the bolt 56 is passed and a tapping for forming a female thread are performed, but welding is not performed.

As can be understood by referring to FIG. 4(*c*), in the illustrated embodiment, the plurality of batteries 26 is fixed to the topsides of respective supporting plates 54 by bolts 58. The number of batteries 26 to be fixed to respective supporting plates 54 may be one. Further, the fixing of the batteries 26 to the supporting plates 54 is not limited to the bolts 58, and although not shown, for example, recesses may be formed on side surfaces of the batteries 26, and fixtures formed with protrusions configured to fit into the recesses of the batteries 26 may be adapted to be attached to the supporting plates 54.

In a case where the plurality of batteries 26 is fixed to one sheet of the supporting plate 54 as shown in the illustrated embodiment, each interval between neighboring batteries 26 can be made smaller than a case where one battery 26 is fixed to one supporting plate 54, and therefore, the plurality of batteries 26 is preferably fixed to one supporting plate 54. In a case where one battery 26 is fixed to one supporting plate 54, when the batteries 26 swing with respect to the shelf plates 32 due to vibration generated when the electric-drive hydraulic excavator 2 travels, for example, the plurality of batteries 26 will make different movements respectively. For this reason, it is necessary to make the interval between the neighboring batteries 26 relatively large to prevent the neighboring batteries 26 from interfering with each other. On the other hand, when the plurality of batteries 26 is fixed to one sheet of the supporting plate 54, the batteries 26 fixed to the same supporting plate 54 make the same movement, so that the neighboring batteries 26 do not interfere with each other, and thus the interval between neighboring batteries 26 can be made relatively small.

Any electrical component other than the batteries 26 may be fixed to the topsides of the supporting plates 54. In the illustrated embodiment, as shown in FIG. 3(*b*), battery disconnect units 60 are fixed to the topsides of the supporting plates 54. Each of the battery disconnect units 60 includes a contactor, a fuse, a current measuring instrument, a device (none of which is shown) that acquires information such as cell temperatures and voltages of the batteries 26 from the batteries 26.

As shown in FIG. 1, a cover member 62 that covers upper part, rear part, and side part of the shelf 28 is installed to the machine-body frame 22. The cover member 62, which can be formed of an appropriate metal material, may be provided with a door and the like and may be configured to be accessible to the batteries 26 and the like accommodated in the shelf 28 by opening the door during maintenance.

In the electric-drive hydraulic excavator 2 configured as described above, since the supporting plates 54, to which the batteries 26 are fixed, are installed on respective shelf plates 32 of the shelf 28 via the elastic mounts 42, the effect of distortions of the shelf plates 32 on the supporting plates 54 is reduced by the elastic mounts 42 located between the shelf plates 32 and the supporting plates 54, even if the shelf plates 32 are distorted by welding. Further, since welding is not performed on the supporting plates 54 that support the batteries 26, distortion due to welding is not caused in the supporting plates 54. Therefore, in the electric-drive hydraulic excavator 2, damages of the batteries 26 can be prevented by suppressing generation of local high stresses on the batteries 26.

Further, in the electric-drive hydraulic excavator 2, since vibrations generated during traveling or the like are diminished by the elastic mounts 42, malfunctions or internal damages of the batteries 26 due to exceeding allowable vibration of the batteries 26 can be prevented.

When assembling the electric-drive hydraulic excavator 2, a plurality of batteries 26 can be easily installed on the machine-body frame 22, by preparing in advance a battery shelf assembly (see FIG. 3(b)) in which the batteries 26 are attached to the shelf 28, and fixing the battery shelf assembly to the rear end portion of the machine-body frame 22, as shown in FIG. 2.

Figure 5:
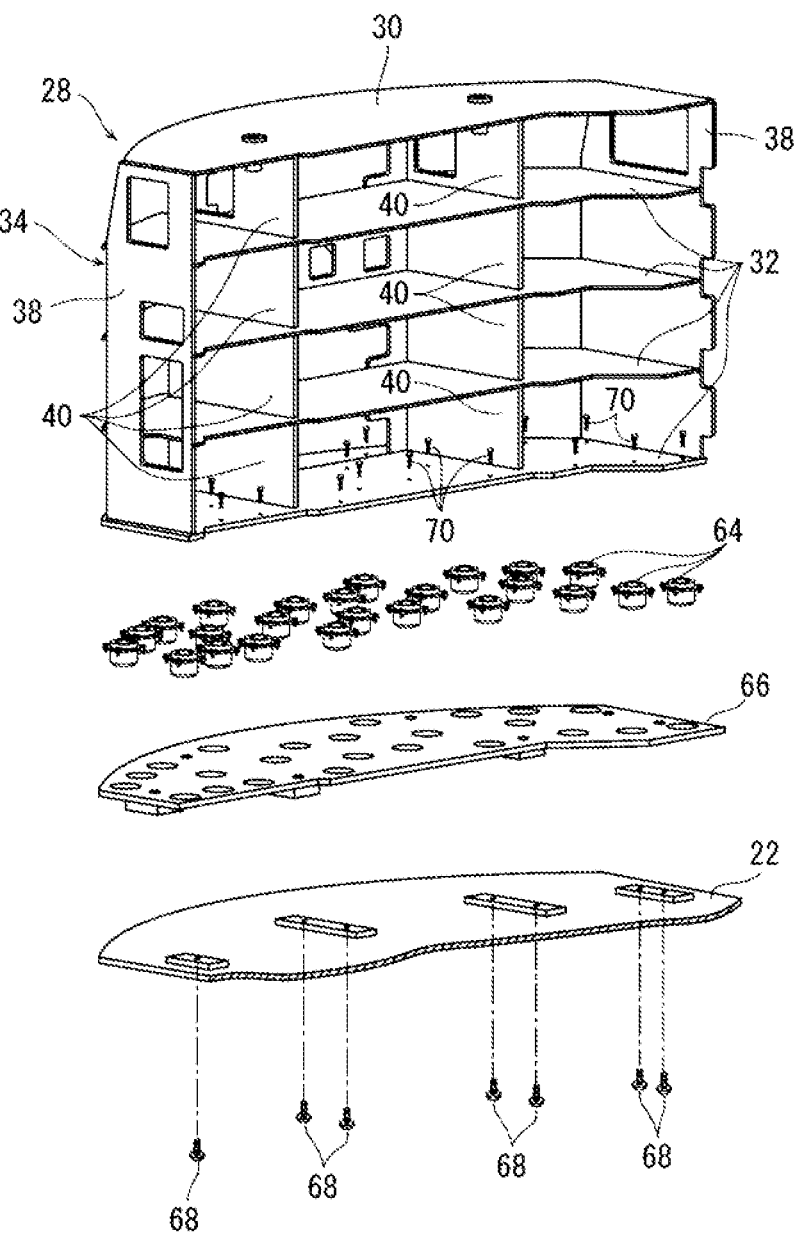
FIG. 5 is a partial exploded perspective view of an electric-drive hydraulic excavator in which the shelf is installed on the machine-body frame via additional elastic mounts.

The above-mentioned shelf 28 is fixed to the rear end portion of the machine-body frame 22 by bolts 36, but as shown in FIG. 5, the shelf 28 may be installed on the rear end portion of the machine-body frame 22 via additional elastic mounts 64. In the example shown in FIG. 5, a retainer plate 66 for retaining the plurality of additional elastic mounts 64 is fixed to the rear end portion of the machine-body frame 22 by bolts 68, and the lowermost shelf plate 32 of the shelf 28 is fixed to the additional elastic mounts 64 by bolts 70, and thereby the shelf 28 is installed on the rear end portion of the machine-body frame 22 via the additional elastic mounts 64. In the example shown in FIG. 5, vibrations transmitted to the batteries 26 are further reduced by the additional elastic mounts 64. As the additional elastic mounts 64, a liquid-filled viscous mount, for example, can be used.

In the illustrated embodiment, a description has been given of an example in which the supporting plates 54 are installed on the topsides of the shelf plates 32 via the elastic mounts 42, and the shelf 28 and the elastic mounts 42 are interposed between the machine-body frame 22 and the supporting plates 54. However, in the present invention, only the elastic mounts 42 may be configured to be interposed between the machine-body frame 22 and the supporting plates 54.

Figure 6:
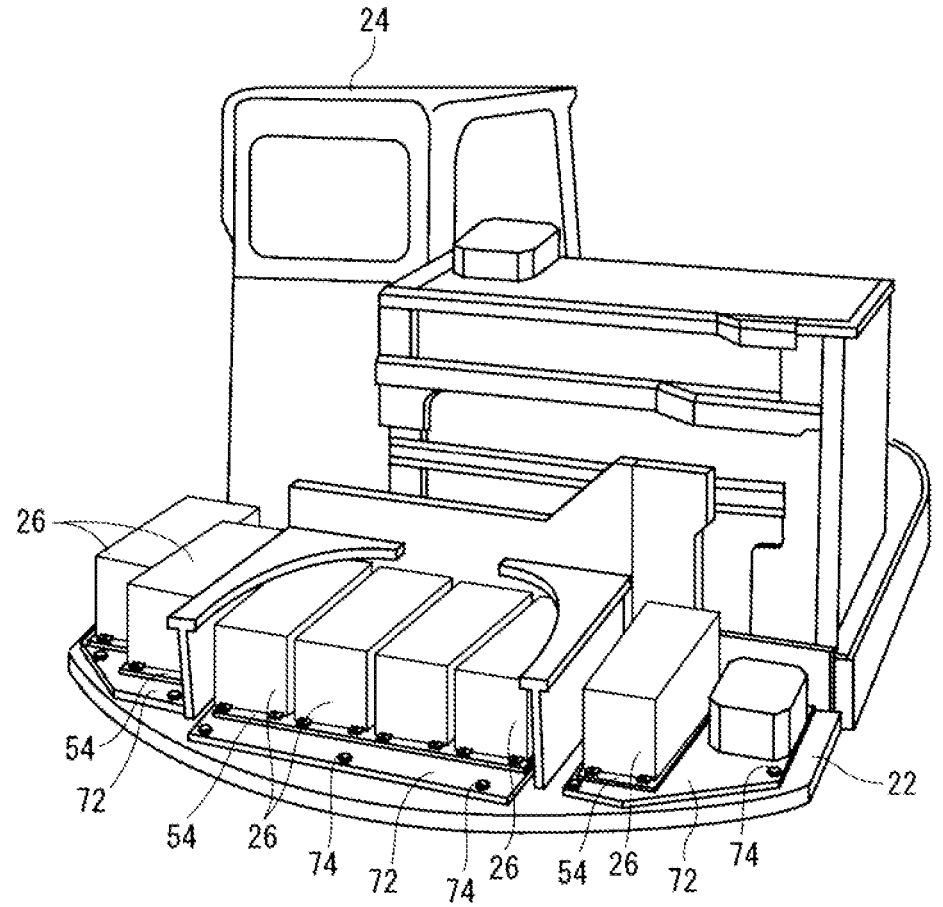
FIG. 6 is a perspective view of an electric-drive hydraulic excavator as viewed from the rear in which the supporting plates fixing the batteries thereon are installed, on base plates fixed to the machine-body frame.

Alternatively, as shown in FIG. 6, one or more base plates 72 may be fixed to the rear end portion of the machine-body frame 22 by bolts 74, and the supporting plates 54 may be installed on the topsides of the base plates 72 via the elastic mounts 42. That is, the base plates 72 and the elastic mounts 42 may be interposed between the machine-body frame 22 and the supporting plates 54. Not only drilling and tapping but also welding may be performed on the base plates 72. The shelf 28, in which the plurality of batteries 26 is installed, may be arranged above the base plates 72.

Further, also in an example shown in FIG. 6, damages of the batteries 26 are prevented by suppressing generation of local high stresses in the batteries 26, and malfunctions or internal damages of the batteries 26 due to exceeding the allowable vibration of the batteries 26 can be prevented. Further, the plurality of batteries 26 can be easily installed on the machine-body frame 22, by preparing in advance a battery base plate assembly in which the plurality of batteries 26 is attached to the base plate 72, and fixing the battery base plate assembly to the rear end portion of the machine-body frame 22.

In the illustrated embodiment, although a description has been given of a case where the present invention is applied to an electric-drive hydraulic excavator, the application of the present invention is not limited to electric-drive construction machine, but the present invention may be applied to a hybrid construction machine that comprises an engine and an electric motor as a drive source.

The invention claimed is:

1. A construction machine comprising a machine-body frame, a base installed on the machine-body frame, first elastic mounts directly installed on the base, a supporting plate configured as a flat plate directly installed on the first elastic mounts, and batteries directly fixed to a topside of the supporting plate, wherein welding is not performed on the supporting plate, wherein the base is a shelf having a plurality of shelf plates arranged at intervals in an up-down direction, the shelf being installed on a rear end portion of the machine-body frame, and a plurality of the supporting plate are provided and installed on respective topsides of the plurality of shelf plates via the first elastic mounts.

2. The construction machine according to claim 1, wherein the shelf is installed on the rear end portion of the machine-body frame via second elastic mounts.

3. The construction machine according to claim 1, comprising a cover member that covers upper part, rear part, and side part of the shelf.

4. The construction machine according to claim 1, wherein electrical components other than the batteries are also fixed to the topside of the supporting plate.

* * * * *